United States Patent [19]

Waletzko

[11] 4,249,556

[45] Feb. 10, 1981

[54] ISOLATING AND BACKFLOW PREVENTING VALVE ASSEMBLY

[76] Inventor: Alfred Waletzko, Zum Berger See 137, 5820 Gevelsberg, Fed. Rep. of Germany

[21] Appl. No.: 954,545

[22] Filed: Oct. 25, 1978

[30] Foreign Application Priority Data

Oct. 26, 1977 [DE] Fed. Rep. of Germany ....... 2747941
Feb. 15, 1978 [DE] Fed. Rep. of Germany ....... 2806310

[51] Int. Cl.³ .................... F16K 31/36; E03B 7/07
[52] U.S. Cl. .................... 137/107; 137/115; 137/496; 137/487.5; 137/488; 137/218
[58] Field of Search ............. 137/107, 312, 496, 492, 137/493, 218, 115, 487.5, 488

[56] References Cited

U.S. PATENT DOCUMENTS

| | | | |
|---|---|---|---|
| 1,105,991 | 8/1914 | Miller | 137/496 X |
| 1,303,801 | 5/1919 | Jones | 137/496 X |
| 2,491,604 | 12/1949 | Carlton et al. | 137/218 |
| 2,538,281 | 1/1951 | Snyder | 137/218 X |
| 2,620,816 | 12/1952 | Griswold | 137/218 |
| 2,624,365 | 1/1953 | Hesson | 137/496 X |
| 3,903,916 | 9/1975 | Waletzko | 137/312 |
| 3,905,382 | 9/1975 | Waterston | 137/218 X |
| 4,044,787 | 8/1977 | Sutherland | 137/107 |

*Primary Examiner*—William R. Cline
*Attorney, Agent, or Firm*—Karl F. Ross

[57] ABSTRACT

A liquid supply system in which liquid is only supposed to flow from a high-pressure upstream portion to a low-pressure downstream portion is provided with a backflow preventer and upstream thereof with an isolating valve assembly. The backflow preventer opens completely whenever the pressure upstream of itself drops below a predetermined minimum, thereby draining the conduit downstream of itself to prevent reverse flow in the line. The isolating valve assembly continuously monitors the pressure in the upstream and downstream conduit portions and shuts a cutoff valve between these portions whenever the pressure differential between the two portions falls below a predetermined minimum, while simultaneously depressurizing or draining the downstream portion. The operation of the isolating valve assembly therefore ensures that in case of a sudden pressure surge downstream of the backflow preventer the cutoff valve will close until the downstream portion has been depressurized sufficiently to actuate the backflow preventer. The isloating valve assembly has a pair of pistons that operate the cutoff valve either directly or through a solenoid, and which are isolated from each other in separate cylinders to eliminate mixing of the liquids in the upstream and downstream conduit portions. A pilot valve may be connected to the cylinder of one of these pistons for applying to this one cylinder the relatively high pressure in the upstream conduit portion when the valve is supposed to operate, and the other cylinder is normally continuously pressurized with this upstream pressure.

13 Claims, 10 Drawing Figures

ISOLATING AND BACKFLOW PREVENTING VALVE ASSEMBLY

FIELD OF THE INVENTION

The present invention relates to an isolating valve assembly. More particularly this invention concerns such an assembly usable in a conduit through which liquid is only supposed to flow from a high-pressure upstream portion to a low-pressure downstream portion, and which is provided with a backflow preventer.

BACKGROUND OF THE INVENTION

It is essential in numerous liquid-feed systems to provide means that prevents any reverse flow of the liquid in a particular line or conduit. Thus in a drinking-water supply system it is absolutely essential that the pure-water supply be protected from flow back into it of water from the mains or installations to which it is connected. It is also essential in chemical plants and the like to provide many liquid supply lines with similar such protective devices which, for instance, prevent a solution from being forced back into a line through which the solvent is fed.

Accordingly there is known a backflow preventer valve as described in my earlier U.S. Pat. No. 3,903,916. Such an arrangement is built into the conduit to be protected. It forms an open fluid connection so long as the pressure upstream of itself remains above a predetermined minimum. When, however, the pressure upstream of such a backflow preventer falls below the predetermined minimum this preventer not only closes but also opens up the downstream portion so as to depressurize same. Thus in the event that the supply pressure drops so that the pressure in the downstream portion could cause reverse flow, this arrangement will surely and safely segregate the two lines and drain the downstream portion.

Such an arrangement has been found extremely practical. Nonetheless in one particular circumstance it has been found to be inadequate: when the pressure downstream of the backflow preventer rises above the pressure upstream, with no dropping of the upstream pressure. Although a checkvalve is normally provided in such a backflow preventer to prevent any reverse flow in this situation, experience has shown that such a checkvalve alone is often insufficient to adequately protect the upstream fluid supply, as such a checkvalve operates so rarely that it frequently becomes wedged, and furthermore because the pressure downstream can occasionally build up to a level which the checkvalve cannot resist.

OBJECTS OF THE INVENTION

It is therefore an object of the present invention to provide an improved valve assembly.

Another object is to provide such an assembly which will prevent flow through a conduit in the above given circumstances.

A further object is to provide such an assembly which works with the known backflow preventer to safely and surely protect a conduit through which flow is only supposed to take place in one direction.

SUMMARY OF THE INVENTION

These objects are attained according to the instant invention in an isolating valve assembly having a closable cutoff valve between the upstream and the downstream conduit portions. Operating means is connected to this valve and is connected to both of the portions for detecting the upstream and downstream pressures in the portions and for closing this cutoff valve when the pressure differential between the portions falls to a predetermined minimum. Furthermore, drain means is provided which is connected to the downstream portion and which is jointly operable with the cutoff valve preventing the liquid from the downstream portion on closing the cutoff valve to drain the downstream portion.

When such an isolating valve assembly is combined with the conduit having a backflow preventer as described in my earlier patent it will ensure that in the event the pressure rises downstream to a level where a risk is created of flow back through the lines, without any drop in the downstream pressure, the isolating valve assembly will simultaneously close off the two portions from each other and vent the downstream portion. The immediate result of this will be, when the isolating valve assembly is slightly upstream of the backflow preventer, depressurization of the line immediately upstream of the backflow preventer so that this unit itself will be made to respond and open up. If the problem is only a temporary pressure surge, once the downstream pressure has been relieved and a safe pressure is reestablished therein, the isolating valve assembly will open up its cutoff valve and the backflow preventer will close the fluid circuit to reconnect the upstream and downstream portions. If, however, the pressure downstream remains at the elevated level the limited draining of this downstream portion will not be sufficient to create a pressure differential sufficiently large to open the cutoff valve so that the cutoff valve will at least itself remain closed.

According to further features of this invention the operator for the cutoff valve includes a pair of pistons connected together by a stem and received in respective compartments. One of these compartments is continuously pressurized by the fluid from the upstream portion and the other compartment may be continuously pressurized by fluid from the downstream portion or may be connected via a pilot valve to the upstream portion. The pilot valve opens to pressurize this other chamber whenever the above-described minimum pressure differential is undershot, but otherwise vents this other cylinder. These two pistons may be connected directly and mechanically to a cutoff valve, or may operate a limit switch that in turn operates the cutoff valve. It is also possible to use this double-piston assembly as a pilot valve that operates a heavy-duty membrane-type valve serving as the cutoff valve.

With this last-mentioned arrangement it is possible to provide solenoid-controlled valves which reverse the above-given functions so that only on power failure is the isolating valve assembly effective, but otherwise the membrane-type valve is held closed and the downstream conduit portion is drained for use of the system, for instance, as an emergency cooler for a continuous-casting plant.

According to further features of this invention the stem extending between the pistons may be constituted as a spool valve which is connected to the downstream portion and to a drain so as automatically to vent this downstream portion when the pistons move to close the respective cutoff valve. As mentioned above the drain line is a relatively small flow cross section so that if a large and persistent pressure surge is present in the downstream portion this line will not be able to drain rapidly enough to create the pressure differential necessary to open the cutoff valve.

Extreme precautions are taken to prevent any mixing of the liquids from the upstream and downstream conduit portions. This is effected with the double-piston valve assembly by separating the two cylinders physically from each other, rather than simply applying one liquid onto one side of a piston and another liquid to the other side, and venting the two chambers toward each other so that any mingling or mixing of the liquids is impossible. When a pilot valve is used this expedient is also employed, by making throughgoing holes in the housing that expose the center of a spool valve against whose one end is applied the upstream pressure and against whose other end is applied the downstream pressure. Thus even if there is some leakage around the seals of this spool, fluids will not be forced into the other compartments but will instead drain out of the middle of the housing.

Thus this system according to the instant invention provides another level of protection for a line through which flow is only supposed to take place in one direction. The valve assembly according to this invention ensures that in the event that a situation occurs wherein such reverse flow is possible a valve will automatically be closed and the downstream conduit portion will be depressurized. When combined with the backflow preventer as described in my earlier patent this system ensures a second level of protection for a liquid line, making any reverse flow under any circumstances virtually impossible.

SPECIFIC DESCRIPTION

Figure 1:
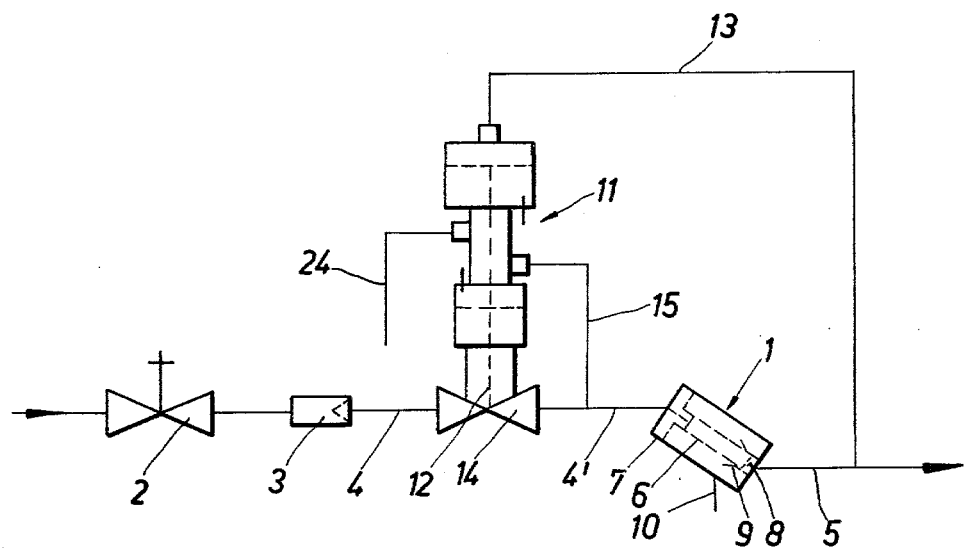
FIGS. 1, 2 and 3 are schematic views of first, second and third systems according to this invention.
Figure 5:
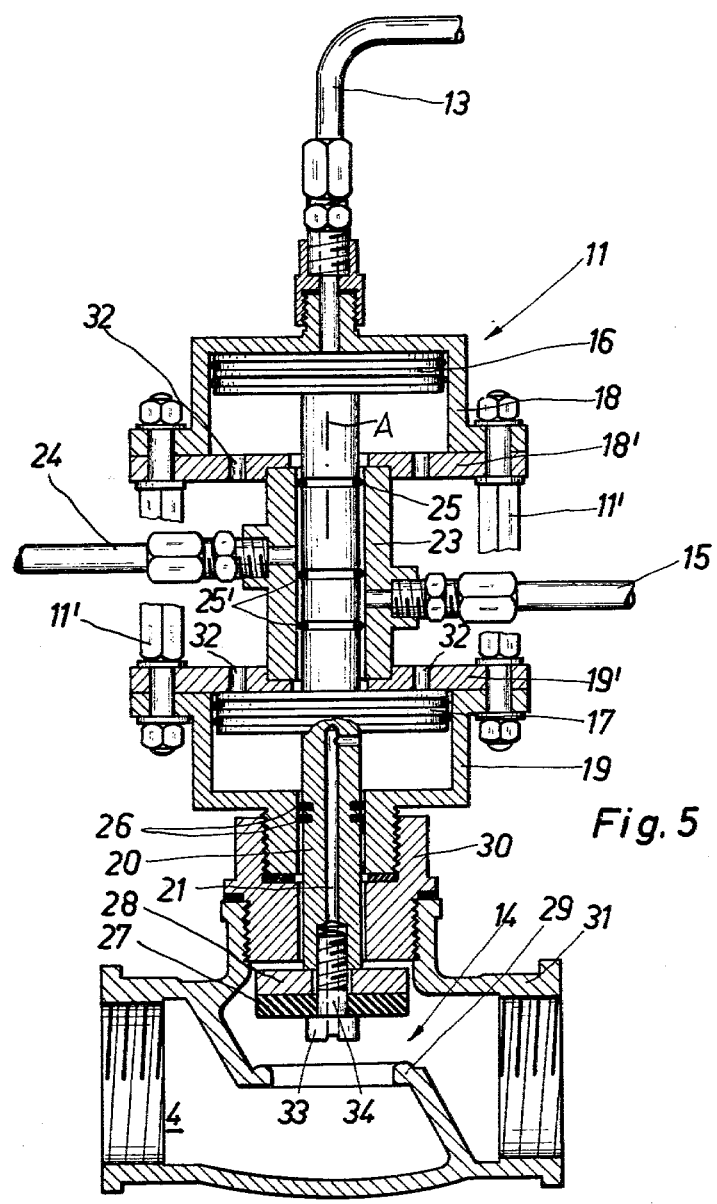
FIGS. 5 and 6 are axial sections through a valve in the open and closed position, respectively, usable in the first and the second systems of FIGS. 1 and 2.
Figure 6:
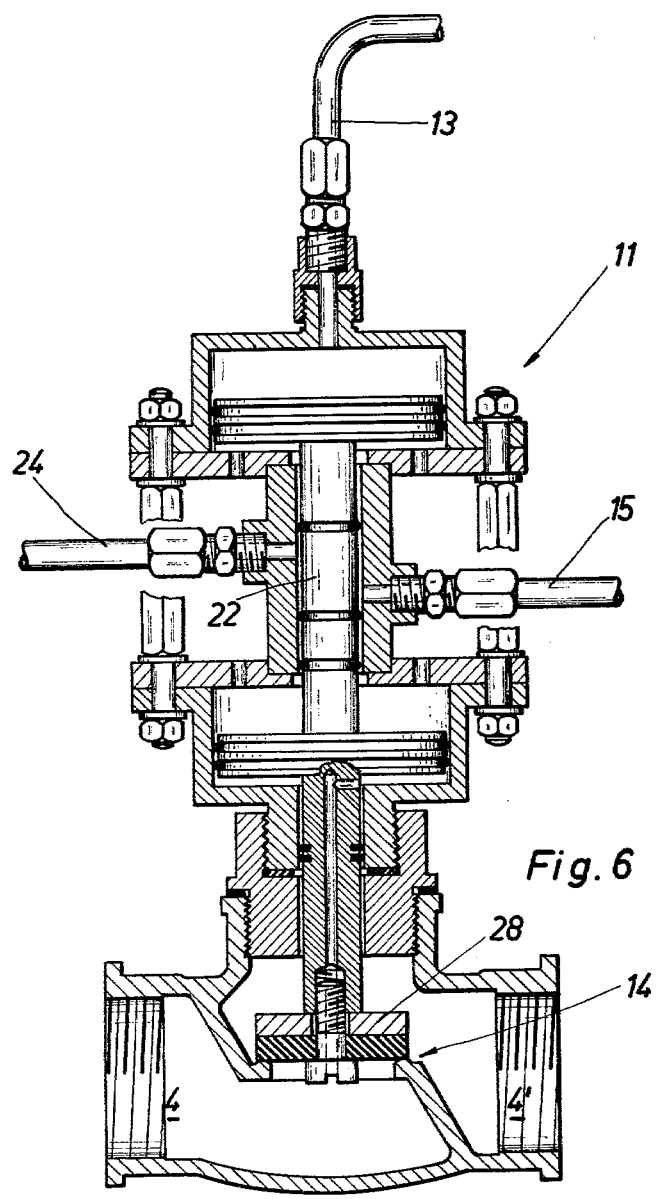

The system shown in FIG. 1, which employs the isolating valve of FIGS. 5 and 6 is for use in a system wherein a backflow preventer 1 of the type described in my U.S. Pat. No. 3,903,916 is connected in a conduit having an upstream portion 4 and a downstream portion 4', with a main cutoff valve 2 and dirt catcher 3 provided in the upstream portion 4. The downstream side of the backflow preventer 1 is connected to a housewater line 5, pure drinking water being fed in through the conduit 4, 4'.

As described in my above-cited patent the backflow preventer valve 1 serving to connect an inlet valve to an outlet conduit has a housing forming a generally cylindrical inlet compartment connected to its inlet conduit portion 4' and an outlet compartment spaced from the inlet compartment and connected to its outlet conduit portion 5. A connecting tube 6 has one end formed as a piston reciprocal in the inlet compartment and another end reciprocal into and out of an outlet compartment 9. The piston 6 in the inlet compartment is formed with at least one circumferential groove having a frustoconical base tapered toward the outlet compartment and receiving a Teflon-bronze seal ring having overlapping stepped ends. A spring urges the tube into a position with its other end spaced from the outlet compartment 9 so as to prevent fluid flow into the outlet compartment 9. Fluid pressure in the inlet compartment above a predetermined level holds the tube 6 with its outer end in the outlet compartment 9 for fluid flow between the compartments. A checkvalve is provided in the inlet compartment to engage over the inlet side of the tube 6 when it is displaced out of the flow position, and similarly a checkvalve 8 is provided on the outlet side of the backflow preventer 1 for preventing flow back into the valve 1 when the tube 6 is out of the flow position. The backflow preventer 1 therefore completely opens up the downstream section to a drain 10 whenever the pressure in the portion 4' immediately upstream of itself drops below a predetermined level, regardless of the pressure in the portion 5 downstream of itself.

As mentioned above the invention is aimed at protecting the pure-water or other supply connected to the upstream conduit portion 4 from being contaminated should the pressure in the downstream portion 5 of the conduit go above a predetermined level relative to the upstream pressure. The standard backflow preventer 1 described above will frequently allow such reverse flow in a conduit when the extreme downstream portion 5 by some accident is pressurized at a pressure above that of the upstream portion 4, even though the checkvalve 8 is supposed to respond in this situation.

Thus according to the instant invention an isolating valve assembly 11 is provided between the two sections. This valve assembly 11 is connected via a pilot conduit or passage 12 to the upstream conduit portion 4 and via another pilot line or conduit 13 to the extreme downstream portion 5. The valve assembly 11 includes a simple cutoff valve 14 that is closed when the pressure detected by the assembly 11 through the conduit 13 rises to within a certain minimum pressure differential of the pressure in the upstream portion 4 connected to the conduit 12.

In addition the assembly 11 is connected via a small line 15 to the intermediate downstream conduit portion 4'. The valve assembly 11 is so set up that when it closes the valve 14 it vents the line 15.

Thus in the event of a pressure surge in the extreme downstream portion 5 the assembly 11 will immediately respond by closing the cutoff valve 14. At the same time this assembly will drain the section 4', thereby normally reducing the pressure in this section 4' to below the level at which the backflow preventer 1 responds, so as to open up the backflow preventer 1 also. The result, of course, will be sudden draining of the extreme downstream section 5. Such draining will normally also be accompanied by sealing of the upstream ends of the conduit portions 4' and 5, so that the desired pressure differential will again return and the valve 14 will open again. Such a reopening of the valve 14 will only occur, however, after the backflow preventer 1 is open. What is more if the pressure surge is so large in the furthest downstream portion 5 that the conduit 15, which is of a relatively small diameter, is not able to lower the pressure in the conduit portion 4' to a level sufficient to activate and open the backflow preventer 1, the valve 14 will remain closed, as the inadequate or nonexistent pressure differential between the upstream portion 4 and the furthest downstream portion 5 will remain.

FIGS. 5 and 6 show the valve 11 in somewhat greater detail. This valve 11 has upper and lower pistons 16 and 17 received in respective cylinders 18 and 19. The lower piston 17 has a piston rod 20 formed with an axially and radially extending passage 21 constituting the conduit 12. A cylindrical stem 22 is connected fixedly to the upper piston 16 and can also be connected to the lower piston 17 or can merely bear axially downwardly thereagainst. This stem 22, which also has a valve function as will be described below, rides in a cylindrical tube or spacer 23 and maintains the pistons 16 and 17 a predetermined distance apart along a central axis A. The cylindrical tube or valve housing 23 is clamped by tie rods 11' between the cylinders 18 and 19 and respective covers 18' and 19'.

The conduit 15 is connected to the tubular housing 23 with the stem 22 as is a further conduit 24 which itself is connected to a drain or otherwise open at atmospheric pressure. The conduits 15 and 24 open at locations axially offset from each other along the stem 22 which is slightly smaller in diameter than the passage through the tubular housing part 23. In addition this stem 22 is provided with an upper seal 25 and a pair of lower seals 25'. In the closed position of the valve the uppermost lower seal 25' is axially interposed between the conduits 15 and 24 so as to isolate them from each other, with the conduit 15 opening into the completely closed chamber formed between the seals 25' around the stem 22.

The piston rod 20 is provided with seals 26 and carries on its lower end a valve body 28 carrying a valve washer 27. This valve washer 27 is engageable with a seat 29 of the housing 31 of the valve 14. In addition this valve 14 has a nut 30 through which the piston rod 20 projects. The valve body 28 and washer 27 are held onto the lower end of the piston rod 20 by means of a screw 33 formed with an axially throughgoing passage 34, which itself forms part of the line or conduit 12 shown in FIG. 1.

The lower chamber of the upper cylinder 18 and the upper chamber of the lower cylinder 19 are vented to the atmosphere via holes 32. Thus the pressure in the extreme downstream conduit portion 5 will be applied via the line 13 to the entire upper face of the piston 16. The pressure in the upstream conduit portion 4 will be applied to the entire surface area of the rod 20 and to the entire lower exposed face of the piston 17.

Under normal circumstances the pressure in the portion 4 is somewhat higher by more than a predetermined margin than the pressure in the downstream portion 5. The margin may be determined either by the dimensioning of the pistons 16 and 17 relative to each other, or by biasing the entire piston assembly in one direction or the other. In the instant case the pistons 16 and 17 are of approximately the same diameter and effective surface area, but the considerable weight of the two pistons 16 and 17, the stem 22, the piston rod 20, and the valve body 28 and associated structure is effective in a direction opposite that of the pressure in the upstream conduit 4. Thus this downwardly effective weight itself determines a predetermined pressure differential which must exist between the portions 4 and 5 for the valve to remain open as shown in FIG. 5.

When this pressure differential is undershot, that is when the pressure in the portion 5 comes within a predetermined pressure difference to the pressure in the line 4, gravity will become effective and the valve 14 will switch from the position of FIG. 5 to the position of FIG. 6. The result will be engagement of the valve washer 27 on the seat 29 to isolate the upstream and downstream conduit portions 4 and 4'. At the same time stem 22 will move so that both of the conduits 15 and 24 will open into the annular chamber formed between the O-rings or seals 25 for draining of the conduit portion 4' via the conduit 24. The result of this is, as described above, depressurization of the line 4' to open the backflow preventer and allow subsequent reopening of the valve 14, or simple constant venting of the conduit portion 4'. In both cases the flow of any water from the conduit portion 4' to the conduit portion 4 is completely ruled out.

The valve opens and closes relatively smoothly, as during opening an upstream pressure drop is experienced the instant the valve washer 27 comes off the seat 29, thereby reducing the force effective upwardly on the mechanism of the valve for slowest and gentlest possible opening. As the valve opens the pressure downstream will increase, thereby automatically slowing its opening until a stasis point is reached. On the other hand when closing the action will be similarly gentle, as the pressure upstream of the valve will increase as the valve closes, thereby automatically slowing the closing action. The device will therefore operate so smoothly that even if it is built in relatively large size it will not operate so rapidly as to create potentially dangerous pressure shocks in the line.

Figure 2:
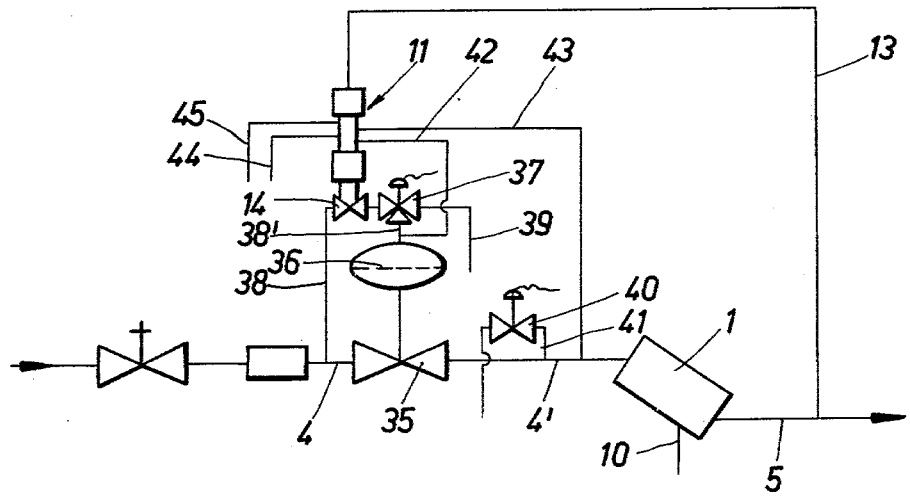

The system of FIG. 2 differs from that of FIG. 1 in that the valve 11 is here used mainly as a pilot valve to control a membrane-type valve 35 operated by a membrane 36 itself pressurizable by means of a three-way solenoid valve 37 connected to the membrane 36 by means of a conduit 38' and connected through valve 14 of the valve 11 to a line 38 connected to the upstream portion 4. The other side of this solenoid valve 37 is connected to a drain conduit 39. Similarly a solenoid-controlled drain valve 40 is connected via a line 41 to the downstream portion 4'.

The valve 11 here is set up with a pair of connections 42 and 43 similar to the connections 15 and connectable to respective drain lines 44 and 45 similar to the drain line 24. Such provision requires several extra seals on the stem 22.

The arrangement described above can be operated in two main ways:

First of all it is possible to operate it using the valve 11 merely as a pilot valve for the valve 35. In this case the valve 40 will be considered to be permanently closed and the valve 37 will be considered to permanently connect the downstream side of the valve 14 with the conduit section 38'. When the pressure in the extreme downstream conduit section 5 rises to within a predetermined pressure differential of the pressure in the conduit section 4 the valve 11 will close first of all to cut the flow of fluid from the line 38 to the line 38', and second to drain the line 38' via the drain conduit 42. Simultaneously the drain conduit 43 will also be vented. Thus a relatively small valve 11 can operate a very large membrane-type valve 35.

It is also possible to exactly reverse the operation of the system according to this invention for use of this device for cooling of a continuous-casting setup in the event of power failure. To this end the valve 37 is set up so that when the solenoid valves 37 and 40 are energized they are respectively closed and opened, that is when energized the valve 37 is closed so as to connect the line 38' to the drain 39, thereby closing the valve 35, while the valve 40 is opened to depressurize the line 4'. Thus so long as the electric supply is applied the line 4' will be disconnected and depressurized for opening of the backflow preventer 1 and complete depressurization of the downstream section 5. When the power fails, however, the valve 37 will connect the lines 38 and 38' together and will close off the drainline 41. Thereafter functioning will be as described above, with the emergency waterline being protected against backflow.

Figure 3:
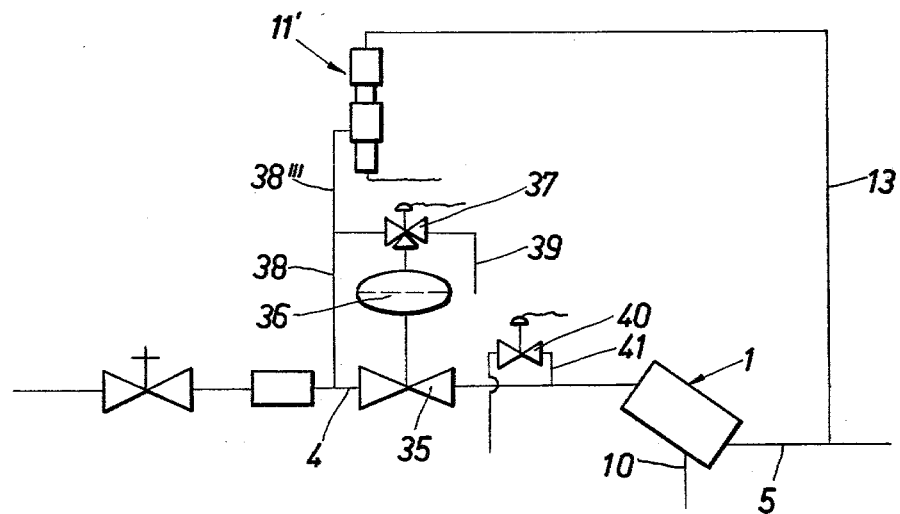
Figure 4:
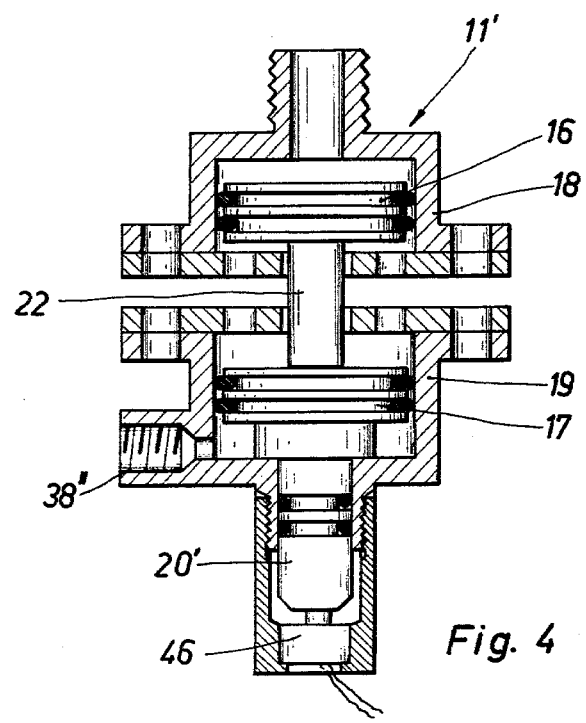
FIG. 4 is an axial section through a valve usable with the third system of FIG. 3.

It is also possible to employ a system such as shown in FIGS. 3 and 4 which is identical to that of FIG. 2, but wherein a valve 11' is employed whose stem 20' operates a limit switch 46 which can operate the valves 37 and 40, here via an emergency-power network to depressurize the membrane 36 and thereby close the valve 35 and similarly to open the valve 40 in case of power failure. To this end the chamber below the piston 17 is pressurized at a connection 38" from a conduit 38"' with the pressure in the upstream conduit portion 4. Obviously the solenoid-type valve 11' of FIG. 4 could be employed to operate a solenoid valve replacing the valve 14 of FIG. 1, as desired.

Figure 7:
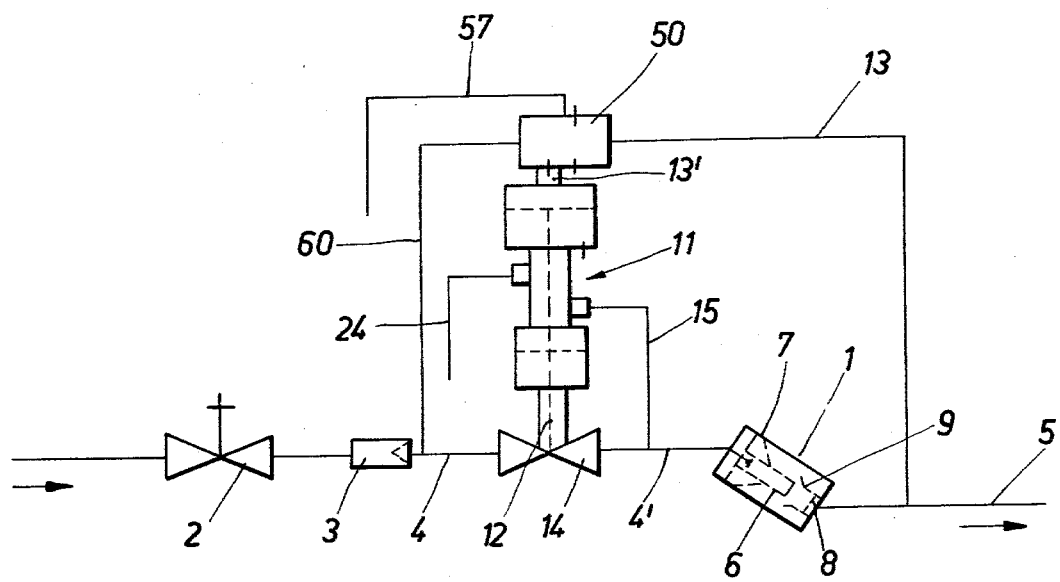
FIG. 7 is a largely schematic view of a fourth system according to this invention.
Figure 8:
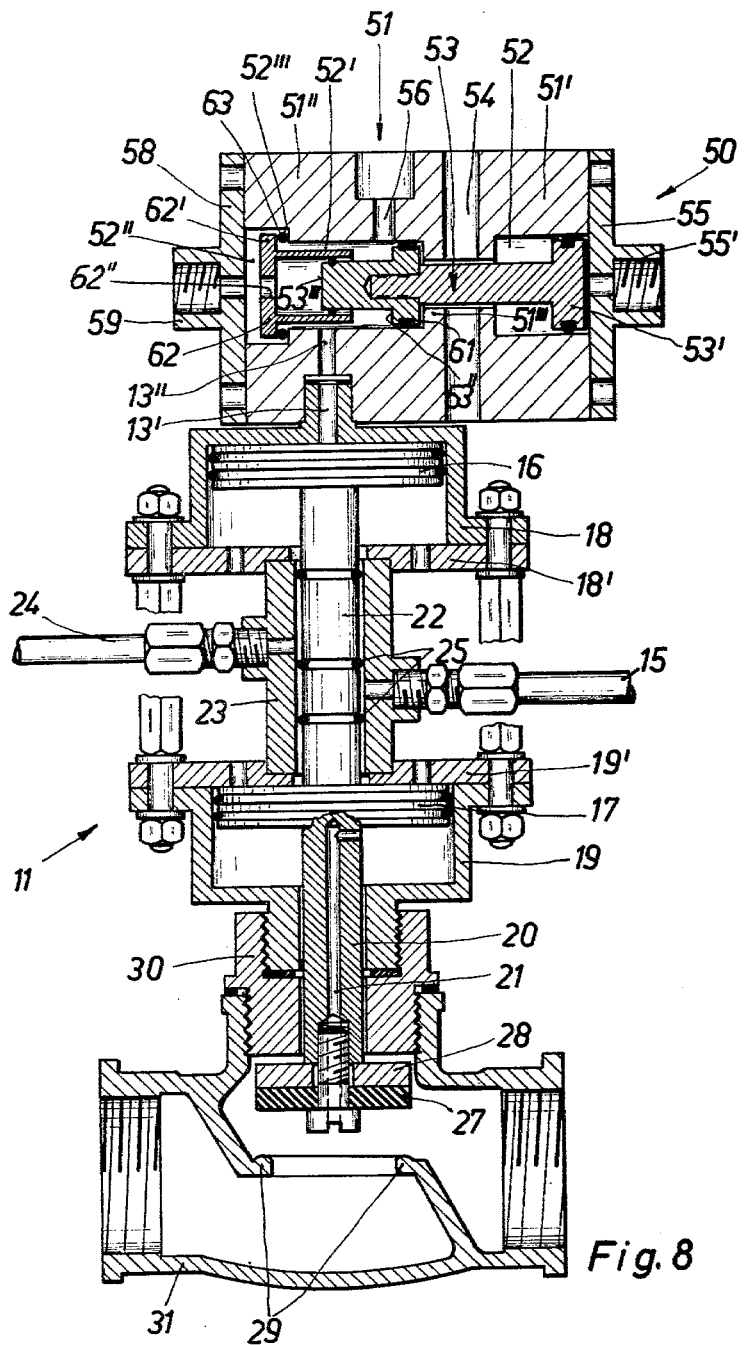
FIG. 8 is an axial section through the isolating valve assembly of the fourth system of FIG. 7.

FIGS. 7 and 8 show another arrangement wherein a pilot valve 50 is employed to operate the valve 11. This valve 50 has a housing 51 having halves or parts 51' and 51" and formed with a stepped bore having an intermediate-diameter section 52 in the part 51', and a small-diameter section 52' separated from a large-diameter section 52" by a shoulder 52"' in the housing part 51'. A diametral and throughgoing bore 54 extends through the housing between the parts 51' and 51" and traverses the stepped bore between the portions 52 and 52'. A valve body 53 having a piston 53' reciprocal axially in the portion 52 and another piston 53"' axially reciprocal in the portion 52' has an end surface 53" also in the stepped-bore portion 52'. These two pistons 53' and 53" are interconnected axially rigidly with each other by the stem of the valve which extends across the transverse bore 54 so that fluid communication between the compartments or chambers 52 and 52' is virtually impossible.

Another valve body 62 fits snugly over the end of the valve body 53 and has a rim 62' engageable via an O-ring 63 with the shoulder 53"'. An end plate 58 closing the compartment 52"' has a nipple 59 to which is connected a conduit 60 which leads as shown in FIG. 7 to the upstream conduit portion 4.

At the other end of the housing 51 a cover plate 55 has a nipple 55' that is connected via the conduit 13 to the extreme downstream portion 5 as also shown in FIG. 7. A passage 13" opens into the bore portion 52' and is fitted to the connection 13' leading into the compartment in cylinder 18 above piston 16. Furthermore axially offset from this passage 13" is another vent passage 56 which is open to the atmosphere either directly or through a vent line 57.

Under normal operating conditions relatively high pressure is fed to the chamber 52" to pass through an aperture 62" formed in the member 62 so that this pressure will be effective axially toward the right against the end face 53" of the valve body 53. Effective axially oppositely and toward the left as seen in FIG. 8 on this valve body 53 will be the somewhat lower pressure in the downstream portion 5. The effective surface area of the left-hand end of the piston-type valve body 53 is substantially smaller than the effective surface area of the right-hand end of the piston 53', so that the valve body 53 will only remain in the right-hand illustrated position so long as the pressure in the upstream conduit portion 4 exceeds the pressure in the downstream conduit portion 5 by a predetermined differential. In this position the upper portion of the cylinder 18 above the piston 16 is at atmospheric pressure, being vented through the passage 13", the compartment 52', and the vent passage 56. Thus the pistons 17 and 18 will be in their upper position, with the full force of the fluid in the portion 4 being effective on the bottom of the piston 17. At the same time this same relatively high-pressure fluid will be effective to hold the member 62 tightly against its seal 63, thereby effectively subdividing the compartments 52' and 52" from each other.

When the pressure differential between the conduit portions 4 and 5 becomes smaller than a predetermined minimum, however, the low pressure effective on the piston portion 53 will be able to overcome the force effective on the piston end 53"', so that the entire valve body 53 will move toward the left as seen in FIG. 8. The first effect of this motion will be to move the piston portion 52" and its seal 61 part the passage 56, thereby cutting off the chamber above the piston 16 from the atmosphere. Further displacement toward the left will bring the surface 53"' into abutment with the member 62, thereby pushing it off the seal 63 and allowing the relatively high-pressure fluid from the upstream conduit portion 4 to pass from the compartment 52" into the compartment 52' and thence into the chamber above piston 16. The immediate effect of this will be a displacement of the valve 11 from the position shown in FIGS. 5 and 8 into the position shown in FIG. 6. with closing of the valve 14 and venting of the conduit 15.

Should the pressure in the downstream conduit portion 5 then drop again so that the differential between the two sides exceeds the predetermined minimum, the valve body 53 will move toward the right, thereby bringing the member 62 back against the seal 63 to isolate the compartments 52' and 52" from each other, and thereafter to uncover the passage or port 56 to depressurize the chamber above the cylinder 16.

Rather than relatively dimensioning the piston portions 53' and 53"' as shown above it is possible to use the same size or oppositely relatively dimensioned piston portions, and to provide a spring between the shoulder 51"' of the housing part 51" and the piston portion 53". In any case the system as described above will be extremely fast-acting, opening and closing rapidly and surely. Furthermore the provision of the pilot valve 50 provides another means for preventing mixing of the upstream and downstream liquids.

Figure 9:
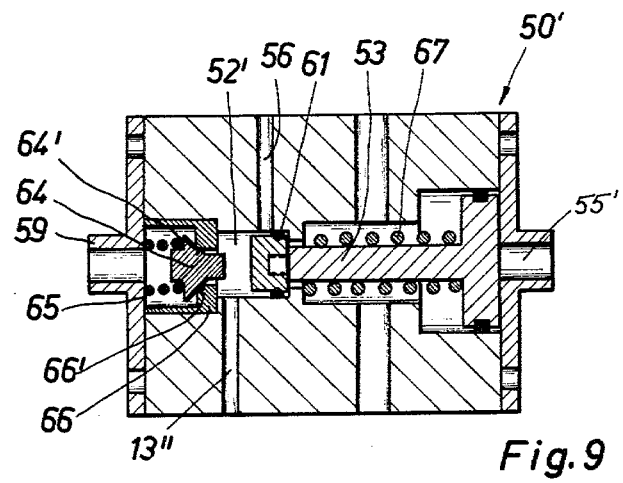
FIGS. 9 and 10 are sections through pilot valves usable in the fourth system of FIGS. 7 and 8.

FIG. 9 shows another pilot valve 50 having a housing essentially identical to that of the valve in FIG. 8, but wherein the element 62 of FIG. 8 is replaced by a valve body 64 having a frustoconical surface 64' engageable with the valve seat 66' formed in a cup-shaped valve member 66. A relatively weak spring 65 urges the valve member 64 against the seat 66'. Similarly, a relatively stiff spring 67 urges the valve body 53 toward the right against the force of the liquid from the downstream section 5.

The function of the pilot valve 50' of FIG. 9 is similar to that of valve 50 of FIG. 8. When the force effective on the face of the valve body 53 is sufficient to overcome the force of the spring 67, this valve body 53 moves toward the left, first closing the passage 56 off and then moving the valve body 64 off the seat 66'. The result is pressurization of the chamber above the piston 16 and closing of the valve 14. In other respects the function of this valve 50' is identical to that of the valve 50.

Figure 10:
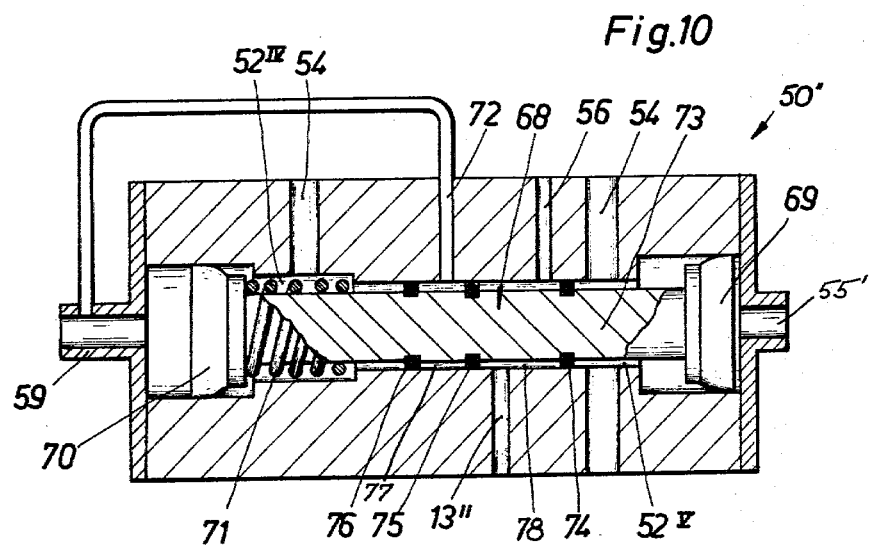

FIG. 10 shows another pilot valve 50" whose ports or passages 15", 54, 55', 56, and 59 are functioning identical to those of FIGS. 8 and 9. In this arrangement, however, a single piston or valve body 68 carries at one end a gland-type piston 69 exposed to the pressurized liquid from the downstream conduit portion 5 and at the other end a gland-type piston of like diameter exposed to the pressurized liquid from the upstream conduit portion 4. A spring 71 in a portion 52$^{IV}$ of the bore receiving the element 68 establishes the pressure differential. In this arrangement a bypass conduit 72 from the connection 59 opens in the normal position of the valve into a chamber 77 defined by O-rings 75 and and 76 of the valve. The passages 13" and 56 open into a chamber 78 formed between the seal 75 and another seal 74. When the pressure in the downstream portion 5 rises to within a predetermined limit of the pressure in the upstream portion 4 the entire valve member 68 will shift toward the left in FIG. 10, thereby cutting the vent port 56 off from the annular compartment 78 and connecting both the pressurized line 72 and the actuating passage 13" to each other via this compartment 78. The result is closing of the valve as described above.

In this arrangement as in all the other arrangements the two sides of the actuating valves are carefully segregated. Here the openings are holes 44 at the region 52$^{IV}$ and at the region 52$^V$ will absolutely prevent a leakage of liquid from one side into the other. Thus the valve itself cannot create backflow.

It is, of course, possible to combine various embodiments with each other. Thus, for example, the pilot valve of FIG. 10 could be used with the valve of FIG. 4. Similarly the valves 37 and 40 of FIGS. 2 and 3 could be employed in the arrangement of FIG. 1 or the arrangement of FIG. 7. Any other permutations of this type are within the scope of the instant invention.

I claim:

1. An isolating valve assembly for use in combination with a conduit through which liquid is only supposed to flow from a high-pressure upstream portion to a low-pressure downstream portion, said assembly comprising:
   a cutoff valve between said portions and having a cutoff-valve member displaceable between a closed position blocking fluid flow between said portions and an open position permitting fluid flow between said portions;
   a drain valve having a drain conduit connected to said downstream portion, a vent line opening outside said portions generally at atmospheric pressure, and a drain-valve member displaceable between a closed position isolating said drain conduit from said vent line and an open position connecting said drain conduit to said vent line;
   an operator having an upstream compartment, a downstream compartment, and an operating member exposed in opposite directions in and partially defining said compartments, said operating member being operatively connected to both of said valve members and being jointly displaceable therewith between one end position corresponding to said open position of cutoff-valve member and said closed position of said drain-valve member and another end position corresponding to said closed position of said cutoff-valve member and said open position of said drain-valve member; and conduit means connecting said upstream and downstream portions to said upstream and downstream compartments for pressurizing same and holding said operating member in said one end position when the pressure in said upstream portion exceeds that in said downstream portion by a predetermined minimum and for displacing said operating member into said other end position when the pressure differential between said portions falls below said predetermined minimum.

2. The valve assembly defined in claim 1, further comprising means connected in said conduit downstream of said closable valve and including a backflow preventer for venting said conduit downstream of said closable valve when the pressure upstream of said backflow preventer falls below a predetermined minimum pressure, said drain conduit being connected to said downstream portion between said closable valve and said backflow preventer.

3. The valve assembly defined in claim 1 wherein said means includes a conduit connected between said downstream compartment and said downstream portion.

4. The valve assembly defined in claim 1, wherein said conduit means includes a pilot valve connected to said downstream compartment and between said upstream and downstream portions for applying to said downstream compartment the pressure in said upstream portion when said pressure differential falls below said minimum.

5. The valve assembly defined in claim 4 wherein said pilot valve is a spool valve having a valve member having one end exposed to the pressure in said upstream conduit portion and an opposite end exposed to the pressure in said downstream conduit portion.

6. The valve assembly defined in claim 5 wherein said one end of said valve member is of smaller effective surface area than said opposite end.

7. The valve assembly defined in claim 5 wherein said ends of said valve member are of generally the same effective surface area, said spool valve including a spring bearing against said valve member in a direction opposite the direction in which said pressure of said upstream portion is effective on said valve member.

8. The valve assembly defined in claim 5 wherein said valve body is displaceable between one end position connecting said downstream compartment to said upstream portion, an other end position venting said other compartment to the atmosphere, and through an intermediate position connecting said other compartment neither to said upstream portion nor to the atmosphere.

9. The valve assembly defined in claim 5 wherein said pilot valve has a housing formed with outwardly open throughgoing holes exposing said valve member intermediate its said ends to the atmosphere, whereby fluid effective on said one end and fluid effective on said opposite end cannot mingle.

10. The assembly defined in claim 1 wherein said operating member includes an upstream piston and a downstream piston and a stem axially extending between said pistons and establishing therebetween a predetermined minimum axial spacing, said operator having upstream and downstream cylinders respectively housing said pistons and forming the respective compartments, said compartments being on opposite axial faces of the respective pistons.

11. The valve assembly defined in claim 10 wherein said drain means includes a spool valve in part formed by said stem.

12. The valve assembly defined in claim 10 wherein said cutoff valve is a membrane valve connected between said portions and having a membrane pressurizable to open said cutoff valve, said operating means including a pilot valve connected to and operated by said pistons and connected between said upstream portion and said membrane for pressurizing same when said pressure differential is greater than said minimum.

13. The valve assembly defined in claim 12, further comprising reversing means including a first valve connected between said pilot valve and said membrane and a second valve connected to said downstream portion for respectively disconnecting said pilot valve from said membrane and draining said downstream portion when electricity is applied to said first and second valves and for connecting said pilot valve to said membrane and closing said second valve when no electricity is applied to said first and second valves.

* * * * *